U̇nited States Patent [19]

Ando et al.

[11] Patent Number: 5,562,928

[45] Date of Patent: Oct. 8, 1996

[54] INJECTION MOLDING APPARATUS FOR MOLDING AN INDICATING MEMBER

[75] Inventors: Yoshihiro Ando; Sadahisa Ando, both of Tokyo, Japan

[73] Assignee: Marui Industrial Co., Ltd., Kanagawaken, Japan

[21] Appl. No.: 531,823

[22] Filed: Sep. 21, 1995

Related U.S. Application Data

[63] Continuation of Ser. No. 189,846, Jan. 31, 1994, abandoned.

[30] Foreign Application Priority Data

Sep. 20, 1993 [JP] Japan ..................................... 5-256455

[51] Int. Cl.⁶ ............................ B29C 45/16; B29C 45/40
[52] U.S. Cl. ...................... 425/130; 264/328.8; 425/556; 425/577; 425/436 R; 425/444
[58] Field of Search ......................... 264/328.8; 425/556, 425/577, 444, 436 R, 130

[56] References Cited

U.S. PATENT DOCUMENTS 4,876,145  10/1989  Maeda et al. ........................... 425/327
4,935,184   6/1990  Sorensen .................................. 264/246
5,030,406   7/1991  Sorensen .............................. 264/328.8
5,294,385   3/1994  Hirota ..................................... 264/45.1

FOREIGN PATENT DOCUMENTS 56-89928   7/1981  Japan .................................. 264/328.8
51-110891  1/1983  Japan .
61-121914  6/1986  Japan .................................. 264/328.8

OTHER PUBLICATIONS

Hao System Brochure, undated, issued by Asahikasei KK.

Primary Examiner—Khanh P. Nguyen
Attorney, Agent, or Firm—Steven P. Shurtz; Brinks Hofer Gilson & Lione

[57] ABSTRACT

An injection molding apparatus for molding an indicating member includes a plurality of molding die portions. The indicating member includes a transparent section, which is formed by injection molding a transparent resin, and an opaque section, which is formed by injection molding an opaque resin. The transparent section has a base portion and an elevated portion that projects from the base portion to form an indicia. The opaque section is formed over the upper surface of the base portion of the transparent section.

5 Claims, 11 Drawing Sheets

INJECTION MOLDING APPARATUS FOR MOLDING AN INDICATING MEMBER

This application is a continuation of application Ser. No. 08/189,846, filed Jan. 31, 1994 now abandoned.

FIELD OF THE INVENTION

This invention relates to an indicating member such as an operation button and/or a key used in various apparatus such as a control panel positioned in front of a driver's seat in an automobile. When the button or key is actuated, a light provided behind is turned on to illuminate the key so as to light up the operation mark or sign formed on the front surface of the key.

BACKGROUND OF THE INVENTION

One such indicating member includes a light-transmittable section or transparent section including a base portion and a marked portion projecting from an upper surface of the base portion so as to form indicia and a non-light-transmittable section or opaque section formed over an upper surface of the base portion except for the marked portion. The light-transmittable and non-light-transmittable sections are formed by injection molding a light transmittable synthetic resin and a non-light-transmittable synthetic resin, or a transparent synthetic resin and opaque synthetic resin, respectively. When the marked portion includes an annular portion surrounding a portion of the upper surface of the base portion as in letters "A", "B" or "O", the non-light-transmittable section is molded as follows: first a light-transmittable section is molded which includes small diameter through-holes provided at the outer side and the inner side of the mark portion surrounding a portion of the upper surface thereof; and, then a non-light-transmittable section is molded by preparing a mold means provided over the molded light-transmittable section to define a first space for molding the non-light-transmittable section and a tunnel-like path provided under the lower surface of the base portion for connecting the small diameter holds formed in the base portion, and by injecting non-light-transmittable synthetic resin into a portion of the first space outside of the surrounding or annular marked portion and then introducing the resin into the other portion of the first space surrounded by the marked portion through the small diameter holes in the base portion of the light-transmittable section and the tunnel-like path. When a molded indicating member that includes the molded light-transmittable section and non-light-transmittable section is removed from the mold, a portion of the non-light-transmittable resin connecting the portions of the non-light-transmittable resin molded in the small diameter holes in the light transmittable section remains.

A mold for providing a tunnel-like path as noted above is complicated and expensive. Further, a non-light-transmittable connecting portion stated above results in a shadow appearing on the marked portion when the indicating member is illuminated by a light provided behind the member and lessens an amount of light transmitted from the back side of the marked portion to the front side of the same. Furthermore, it is troublesome and costly to remove the connecting portion after removing the indicating member from the mold means.

An indicating member of the type as noted above is generally formed by using, for instance, a light-transmittable polycarbonate resin, ABS resin or methacrylic resin as a light-transmittable resin and, for instance, a non-light-transmittable polycarbonate and ABS resin as a non-light-transmittable synthetic resin. Those light-transmittable and non-light-transmittable synthetic resins are weldable with respect to each other. Accordingly, when those resins are molded, the contacting surfaces thereof are fused to each other and an interface therebetween substantially disappears. Accordingly, when a light provided behind the indicating member is turned on and the light beams are transmitted through the marked portion from the back side to the front side thereof, beams which obliquely advance are prone to enter the portion of the non-light transmittable section around the marked portion to thereby be absorbed, whereby a level of light beam reaching the front surface of the marked portion is lowered so that the brightness of the marked portion is lessened.

SUMMARY OF THE INVENTION

An object of this invention is to provide an indicating member which enables light to pass through a marked portion with an increased amount of light with less absorption thereof. An indicating member according to this invention is characterized in that a light-transmittable synthetic resin and non-light-transmittable synthetic resin used to mold the indicating member are not weldable relative to each other.

Another object of this invention is to provide a molding apparatus for molding such a type of an indicating member as stated in the background of the invention. A molding apparatus in accordance with this invention includes a first mold means defining a space for molding the light-transmittable section and a second mold means to be set over the light-transmittable section molded by the first mold means and defining a second space for molding the non-light-transmittable section over the upper surface of the base portion. The first mold means has portions projecting across the first space in the up and down direction by means of which small diameter through-holes are formed in the base portion at the outer side and inner side of the marked portion surrounding the at least one portion of the upper surface. The second mold means has a primary mold portion set over the upper surface of the base portion to define the second space and a secondary mold portion set underneath the lower surface of the base portion to form a third space fluidly connecting the holes formed in the base portion of the light-transmittable portion. The third space has means for holding the non-light-transmittable synthetic resin molded in the third space to separate the molded resin in the third space from the other molded resin and retain it in the third space when an indicating monitor including the molded light-transmittable section and non-light-transmittable section from the second molding means is removed from the mold.

A further object of this invention is to provide a method for molding an indicating member of the same type by using such a molding apparatus as stated above. A molding method in accordance with this invention includes the steps of: injecting a light-transmittable synthetic resin into the first space to mold the light-transmittable section, placing the mold means over the molded light-transmittable section to define the second space, injecting non-light-transmittable synthetic resin into a portion of the second space outside of the mark portion, surrounding at least one portion of the upper surface to fill the portion of the second space and the other portion of the second space surrounded by the marked portion through the small diameter holes formed in the light-transmittable section and the third space, and removing the indicating member including the molded light-transmittable section and non-light-transmittable section with the resin molded in the third space retained therein.

A further object of this invention is to provide a method for molding an indicating member of the same type. A method in accordance with this invention includes the steps of: preparing a first mold means defining a first space for molding the light-transmittable section, the first mold means having portions passing across the first space in the up and down direction by which small diameter through-holes are formed in the base portion at the outer side and inner side of the mark portion, surrounding the one portion of the upper surface, injecting a light-transmittable synthetic resin into the first space to mold the light-transmittable section, placing the second mold means over the molded light-transmittable section to define the second space for molding the non-light-transmittable section and third space under the lower surface of the base portion, the third space being adapted to communicate the small diameter holes formed in the base portion, injecting a non-light-transmittable synthetic resin into a portion of the second space outside of the mark portion, surrounding the at least one portion of the upper surface to fill the portion of the second space and the other portion of the second space surrounded by the mark portion through the small diameter holes formed in the base portion of the light-transmittable section and the third space to mold the non-light-transmittable section and removing the indicating member including the molded light-transmittable section and non-light-transmittable section with the resin molded in the third space being retained therein.

DETAILED DESCRIPTION OF EMBODIMENTS

Before describing embodiments of this invention, the prior art stated hereinabove will be briefly explained with reference to FIGS. 17, 18 and 19.

Figure 17:
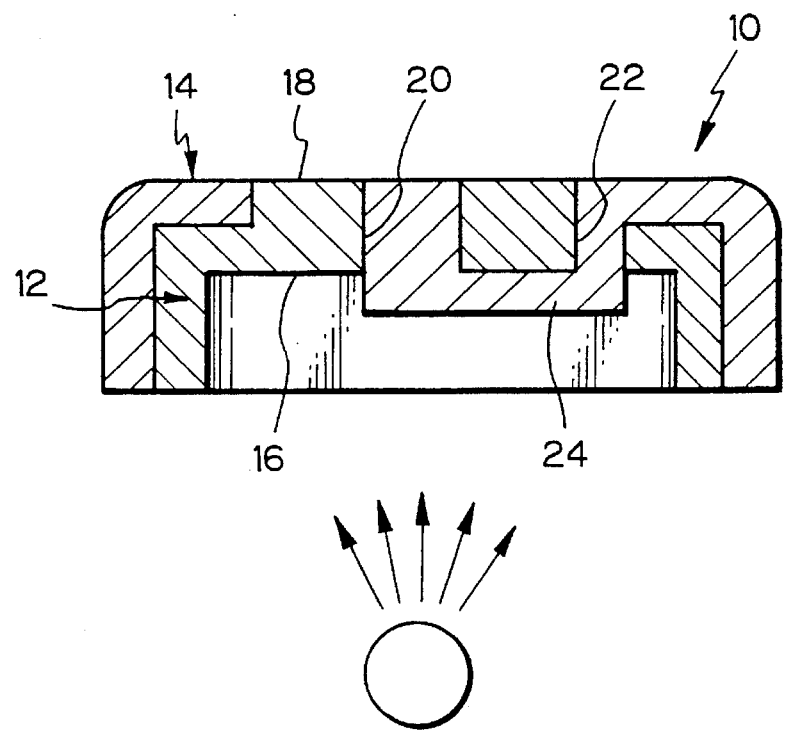
FIG. 17 is a cross-sectional view of an indicating member formed by means of a prior art molding apparatus.
Figure 18:
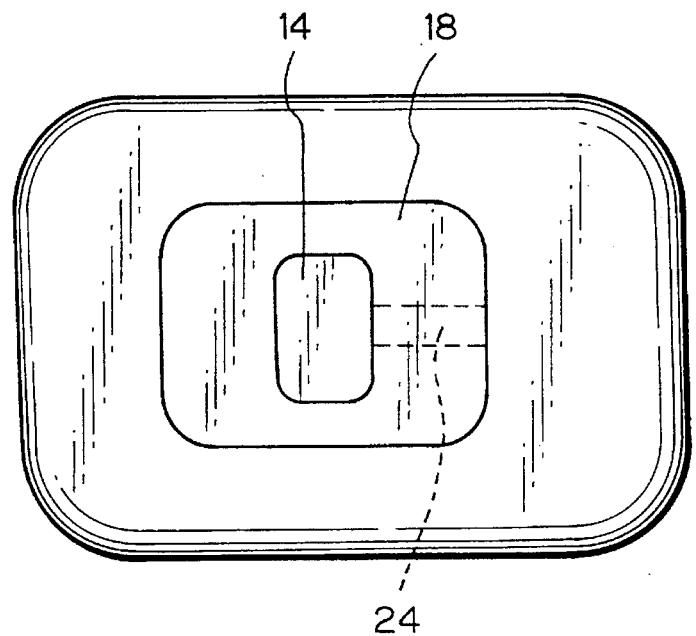
FIG. 18 is a plan view of the indicating member of FIG. 17.
Figure 19:
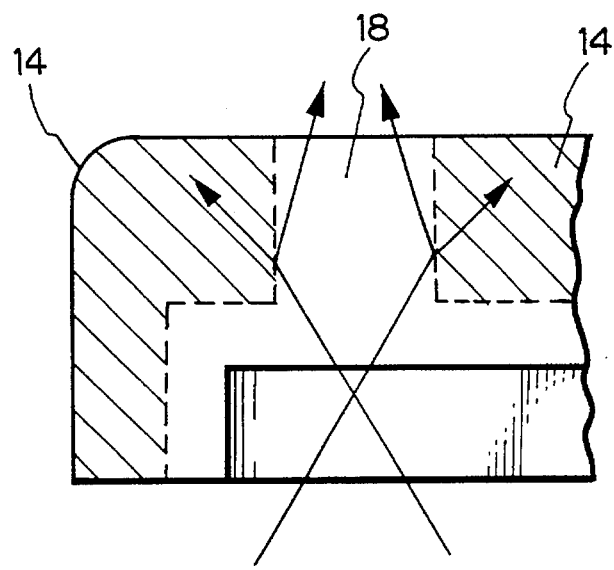
FIG. 19 is a cross-sectional view of a portion of the indicating member of FIG. 17 showing a relationship a marked portion of a light-transmittable section and a portion of a non-light-transmittable section surrounding the marked portion with exaggeration; and, FIG. 20 is a view similar to FIG. 19 showing the same relationship in an indicating member of this invention.

FIGS. 17 and 18 shows an indicating member 10 which is adapted to be used as a key or push-button and adapted to be illuminated by a light L provided behind or under the pushbutton. The push button includes a light-transmittable section 12 and a non-light-transmittable section 14. The light-transmittable section includes a cap-like base portion 15 and a marked portion 18 in the shape of "O" as shown in FIG. 18 projecting from the upper surface of the base portion.

When the push-button is formed, the light-transmittable section having small diameter holes 20, 22 is first molded by injecting a light-transmittable synthetic resin into a mold (not shown) and then a second mold is set over the molded light-transmittable section to define a molding space for molding the non-light-transmittable section 14 over the upper surface of the light-transmittable section except the marked portion 18. The synthetic resin is injected into a portion of the molding space outside of the marked portion 18 to fill the portion and then introduced into the remaining space surrounded by the marked portion 18 through the small diameter holes 20, 22 and a tunnel-like path formed in the second mold under the base portion of the light-transmittable section to connect the small diameter holes. Accordingly, the molded push-button including the light-transmittable and non-light-transmittable sections removed from the mold has a non-light-transmittable resin 24 molded in the tunnel-like path Which causes various problems as stated above. Further, the light-transmittable and non-light-transmittable resins used to form such a prior art indicating member are, as stated hereinabove, weldable to each Other so that the contacting surfaces of these molded sections are fused to each other and a clear interface therebetween disappears as shown in FIG. 19. Accordingly, light beams advancing obliquely through the marked portion are prone to be absorbed by the non-light-transmittable portion surrounding the marked portion.

Next, with reference to FIGS. 1–9, a first embodiment of this invention will be explained. FIGS. 1–7 shows steps of a method of the embodiment for producing an indicating member shown in FIGS. 8 and 9.

Figure 9:
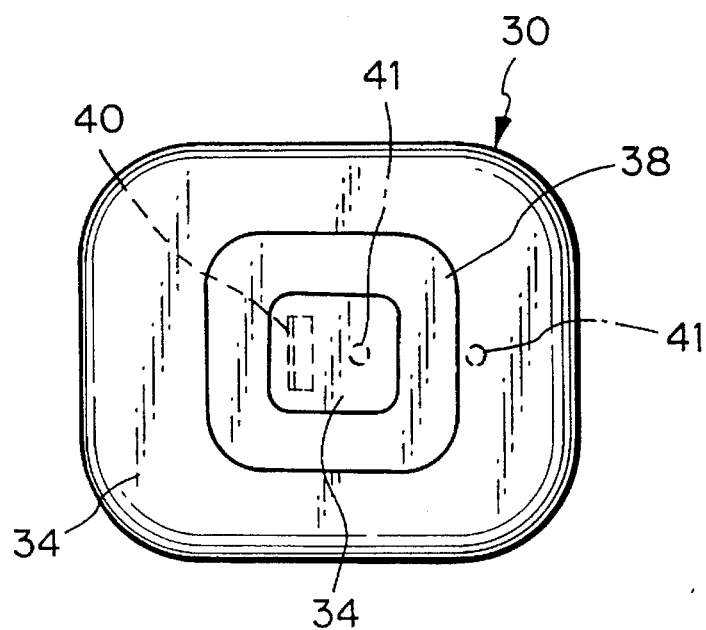
FIG. 9 is a plan view of the indicating member of FIG. 8 which includes a marked portion in the shape of "O"
Figure 10:
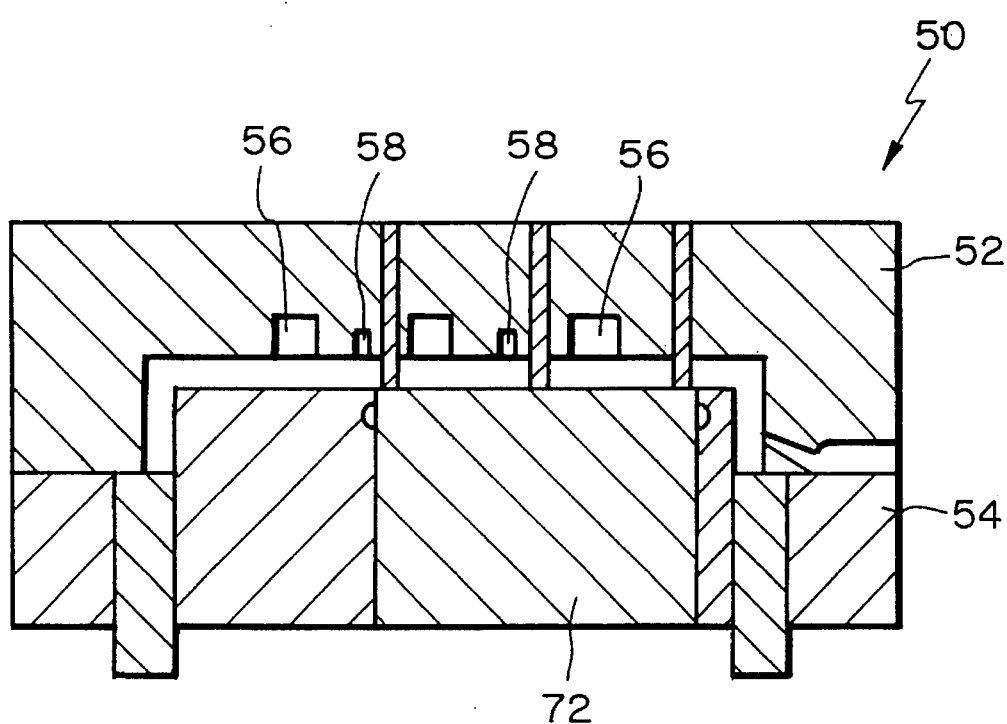
FIG. 10 is a sectional view of a first mold of a second embodiment for molding a light-transmittable section of an indicating member.
Figure 11:
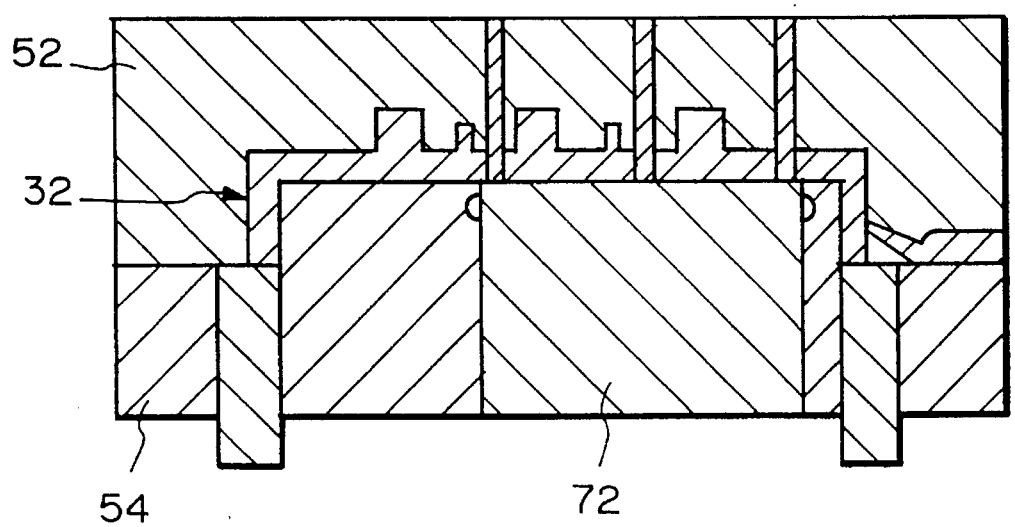
FIG. 11 is a sectional view of the mold of FIG. 10 in which a light-transmittable synthetic resin has been injected.
Figure 12:
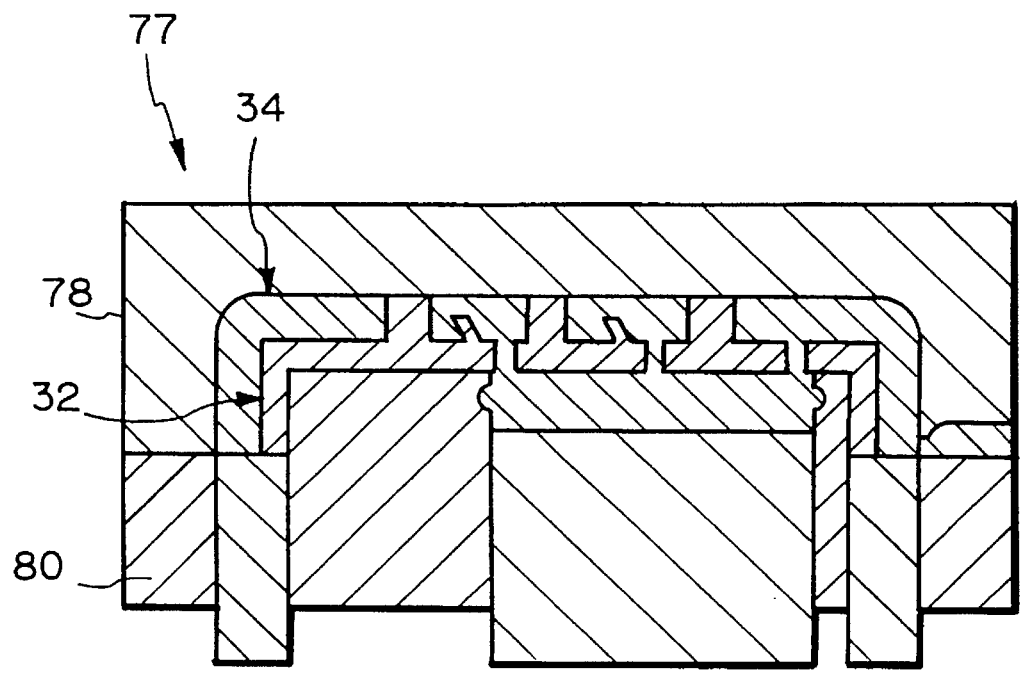
FIG. 12 is a sectional view of a second mold of the second embodiment in which a non-light-transmittable synthetic resin has been injected, the second mold using the lower mold portion of the first mold shown in FIG. 10 as a lower mold portion thereof by moving a piston-like slidable portion thereof down to form a space under the molded light-transmittable section.
Figure 13:
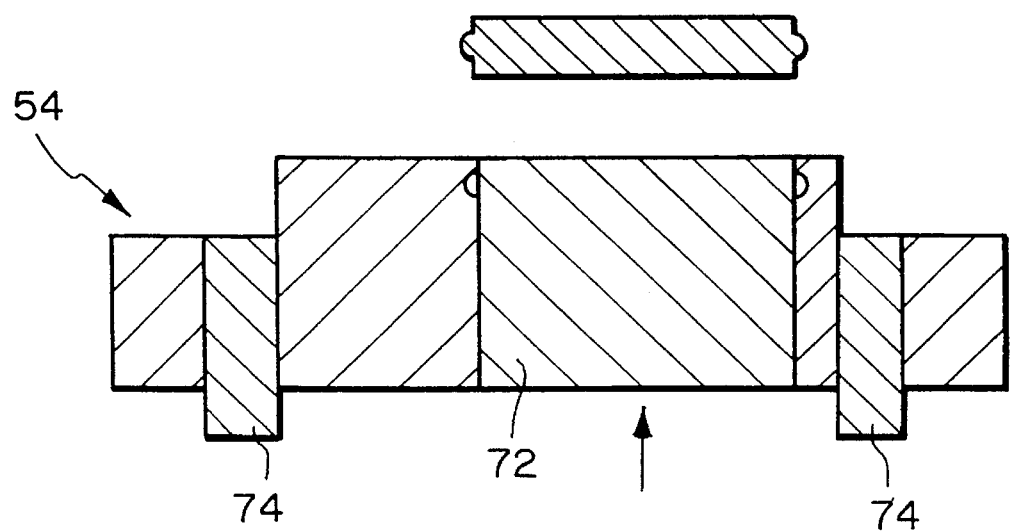
FIG. 13 is a sectional view of the lower mold portion of the second mold in which the piston-like slidable portion thereof is moved upwardly to push a resin molded in the space under the light-transmittable section out of the space.
Figure 14:
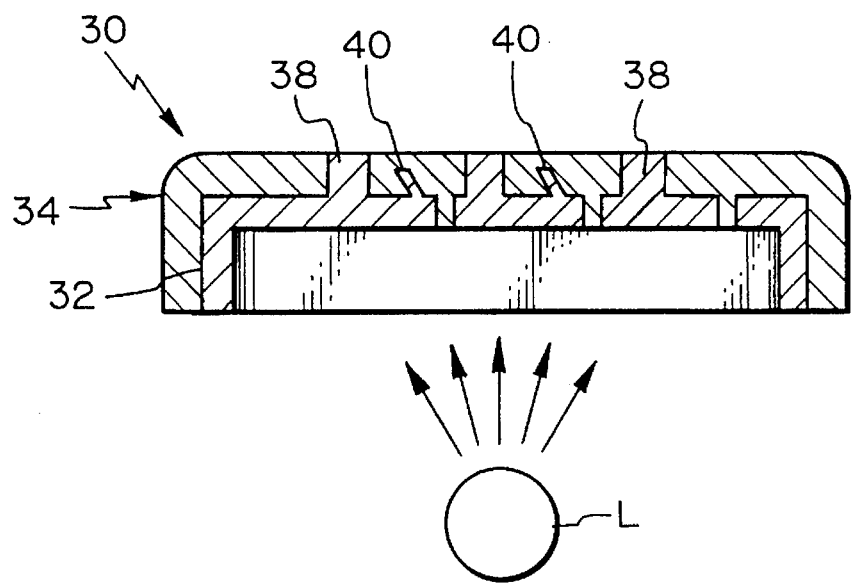
FIG. 14 is a sectional view of the indicating member in accordance with the second embodiment under which a light is positioned to eliminate it.
Figure 15:
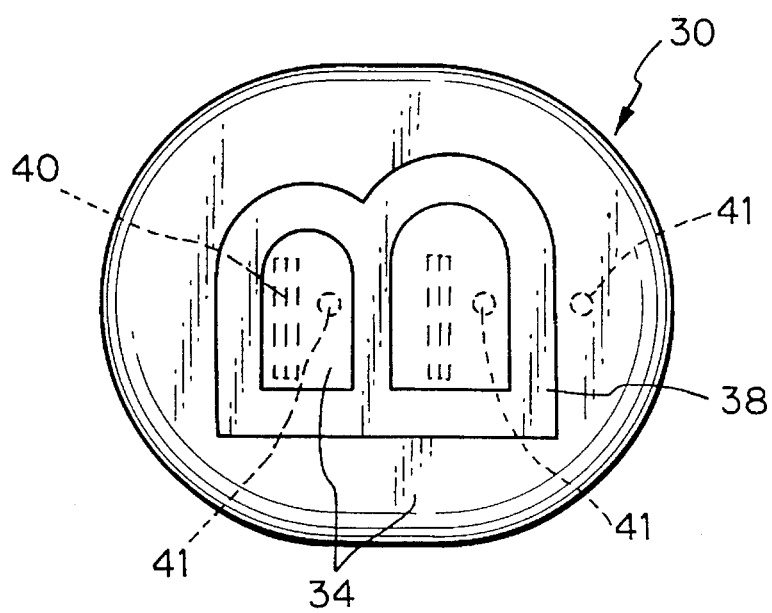
FIG. 15 is a plan view of the indicating member of FIG. 16 in which a marked portion in the shape of "B" is formed.

The indicating member 30 in accordance with this embodiment is a key or push button similar to that shown in FIGS. 17 and 18. The push button including a light transmittable section 32 and a non-light-transmittable section 34. The light-transmittable section includes a cap-like base portion 36 and a marked portion 38 in the shape of "O" as shown in FIG. 9 projecting from the upper surface of the base portion. The light-transmittable section further has an anchoring portion 40 projecting from the upper surface of the base portion surrounded by the marked portion the height of which anchoring portion is smaller than that of the marked portion.

Figure 1:
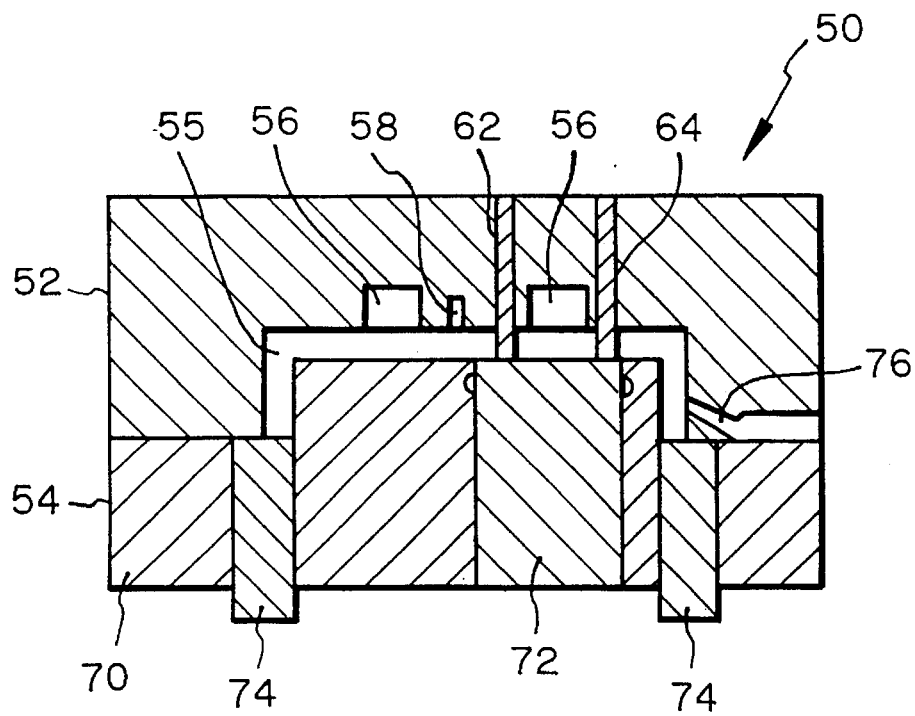
FIG. 1 is a sectional view of a first mold for molding a light-transmittable section of an indicating member.

FIG. 1 shows a first mold 50 having an upper mold portion 52 and a lower mold portion 54 which cooperate to define a first molding space 55 for molding the light-transmittable section 32. The upper mold portion 52 has a first recess 56 for molding the marked portion 38 in the inner or under surface for defining the upper surface of the first annular molding space 55 and a second molding recess 58 for molding the anchoring portion 40. The upper mold portion is provided with two small diameter pins 62, 64 which are positioned at the outer side and inner side of the first recess 56 and pass across the first molding space 55 in the up and down direction in order to form small diameter through holes 41, 41 in the base portion of the light-transmittable section at the outer side and inner side of the marked portion 38. The lower mold portion includes a main body 70 having a stepped or rise portion at the center thereof, a piston-like slidable member 72 which is slidably inserted into a hold formed in the rise portion of the main body and extending from the upper surface of the main body through the body in the vertical direction. The lower mold portion 54 includes a pair of rod-like portions 74, 74 which are slidably inserted into holes formed in the lower molding portion just outside of the rise portion.

Figure 2:
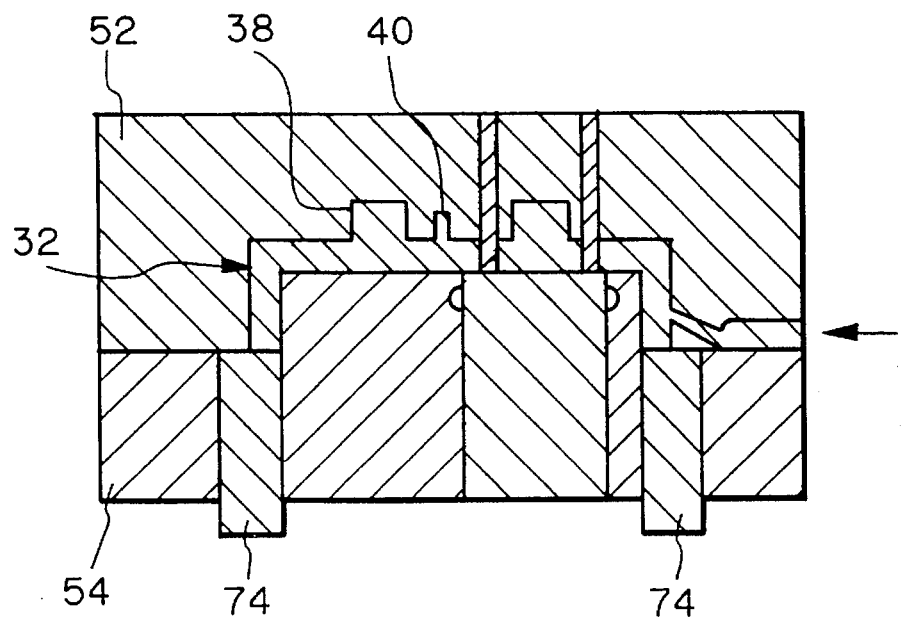
FIG. 2 is a sectional view of the mold in which a light-transmittable synthetic resin has been injected.

The upper and lower mold portions are assembled as shown in FIG. 1 and a light-transmittable synthetic resin is injected into the first molding space 55 from an inlet 76 formed in the upper mold portion as shown in FIG. 2.

Figure 3:
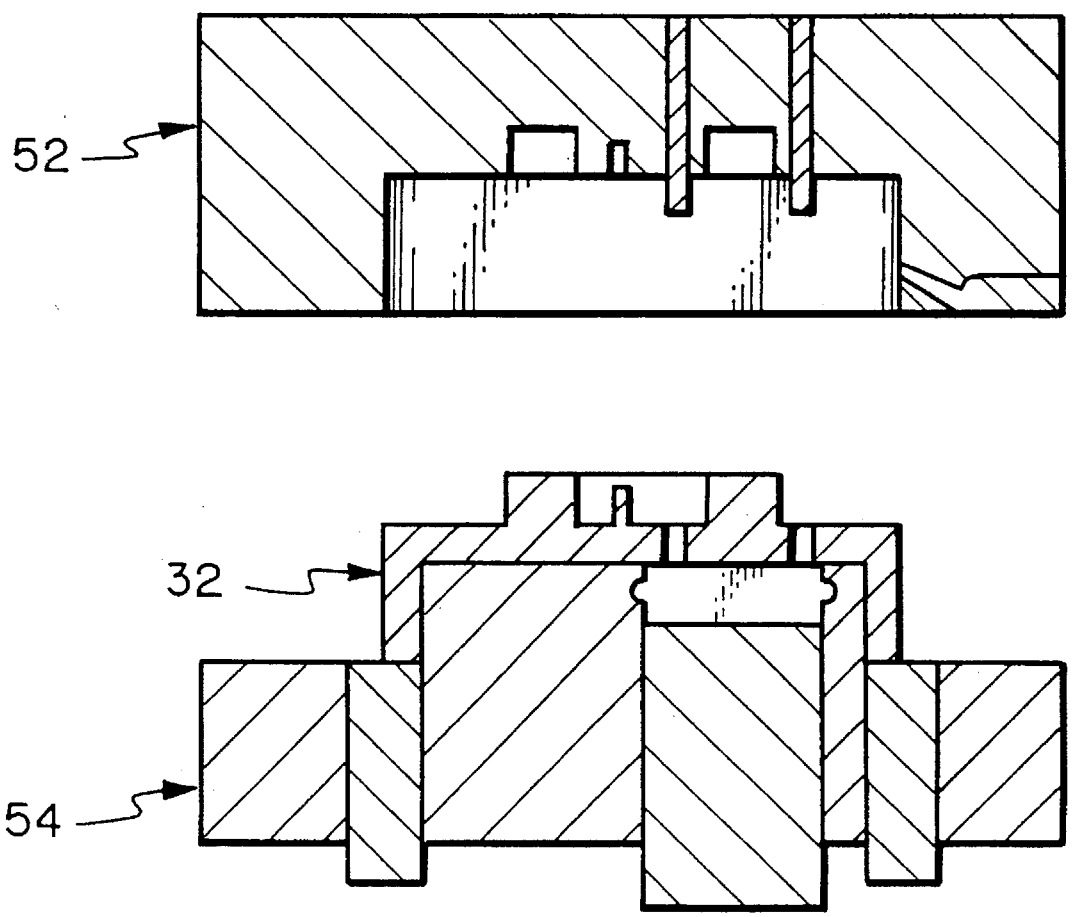
FIG. 3 is a sectional view of the mold of FIG. 2 where an upper mold portion is separated from a lower mold portion with a molded light-transmittable section.

After molding the light-transmittable section, the upper mold portion is, as shown in FIG. 3, removed from the molded light-transmittable section 32 with the lower mold portion being retained.

Figure 4:
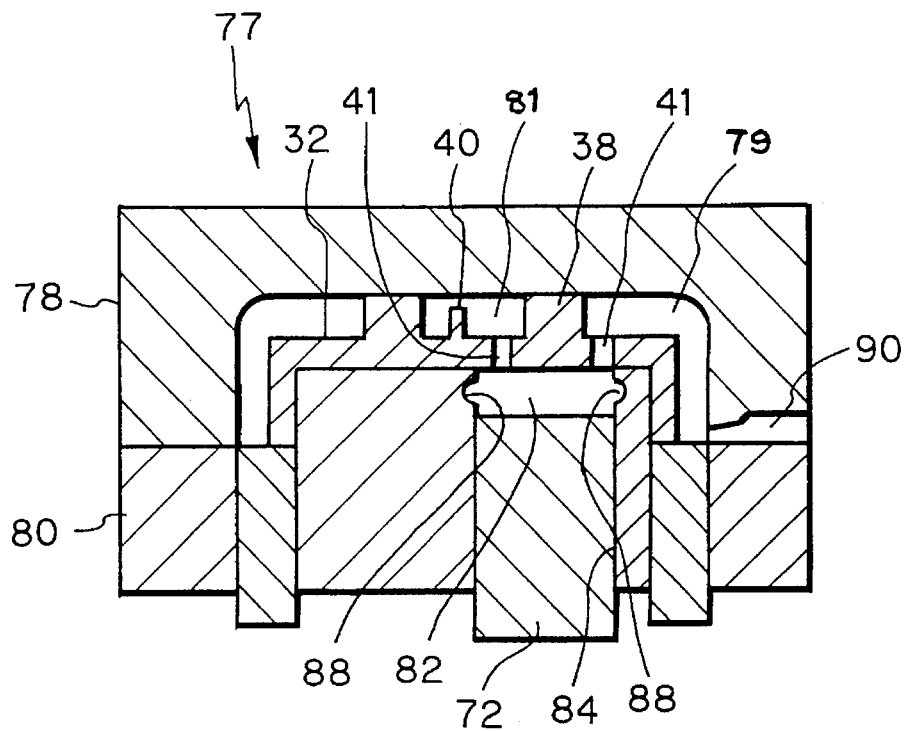
FIG. 4 is a sectional view of a second mold to define a molding space for molding a non-light-transmittable section, the second mold using the lower mold portion of the first mold as a lower mold portion thereof by moving a piston-like slidable portion thereof down to form a third space under the molded light-transmittable section.

FIG. 4 shows a second mold 77 set over the molded light-transmittable section 32. The second mold includes an upper mold portion 78 to cooperate with the upper surface of the base portion of the light-transmittable section 32 to define a second molding space 79 for molding the non-light-transmittable section 34 and a lower mold portion 80 which is in this embodiment the lower mold portion of the first mold in which the piston-like slidable portion 72 thereof is moved downwards a certain length to define a third molding space by a cooperation with the lower surface of the light-transmittable section 32 and the side wall of the through hole 84 in which the slidable portion 72 is inserted such that a resin holding means or annular recess 88 formed in the side wall is exposed.

Figure 5:
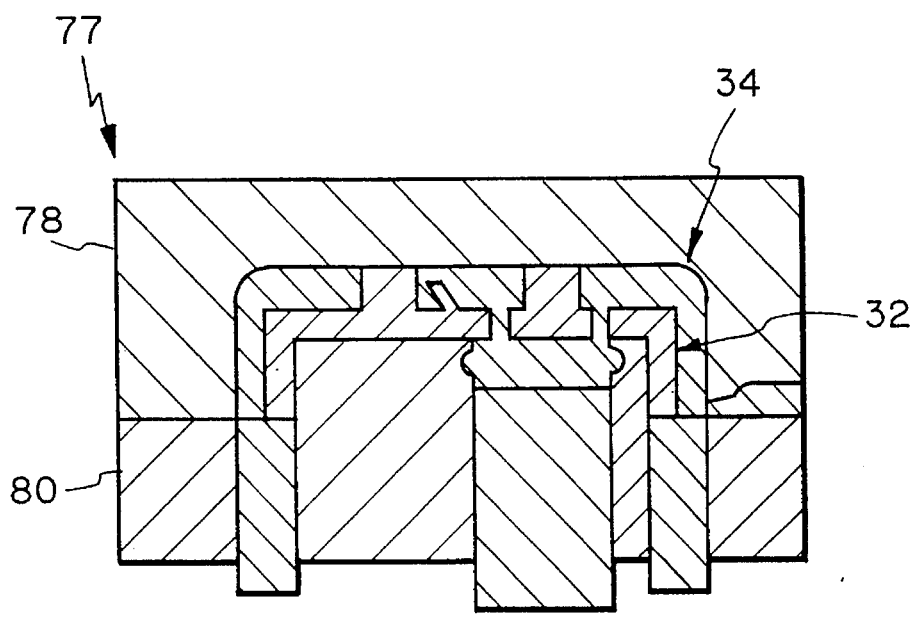
FIG. 5 is a sectional view of the second mold in which a non-light-transmittable synthetic resin has been injected.

A non-light-transmittable synthetic resin is injected into a portion of the second molding space 79 outside of the marked portion 38 of the light-transmittable section from an inlet 90 formed in the upper mold portion 78. The resin is introduced into the remaining portion of the second molding space inside of the marked portion 38 through the small diameter holes 41, 41 formed in the base portion of the light-transmittable section (FIG. 5). At that time, the anchoring portion 40 formed on the light-transmittable portion is forced to be inclined by the pressure of the resin introduced into the remaining space.

Figure 6:
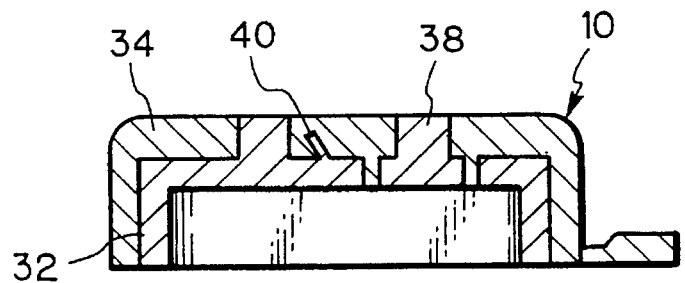
FIG. 6 is a sectional view of the lower mold portion of the second mold and a molded indicating member having the light-transmittable and non-light-transmittable sections removed from the lower mold portion.
Figure 6:
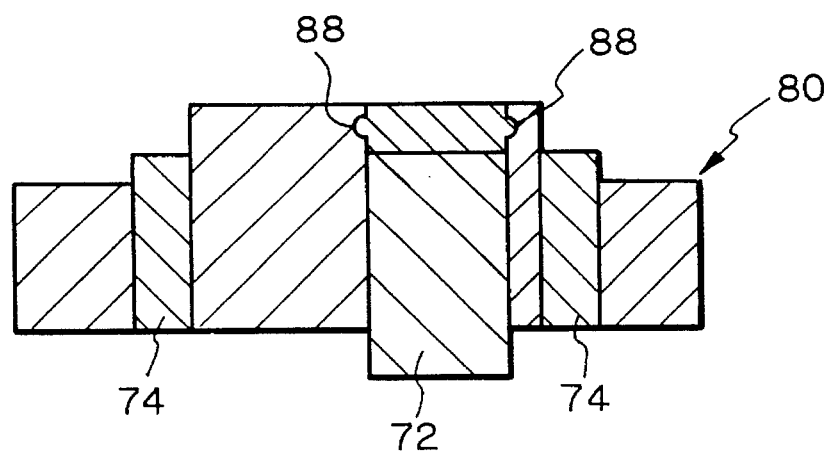
Figure 7:
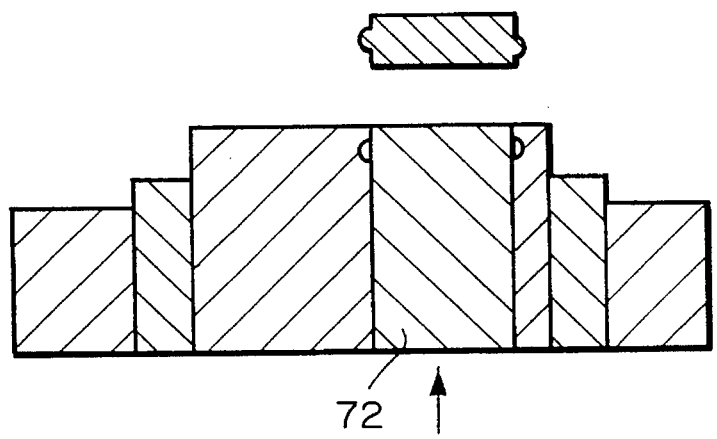
FIG. 7 is a sectional view of the lower mold portion of the second mold in which the piston-like slidable portion thereof is moved upwardly to push a resin molded in the third space out of the space.
Figure 8:
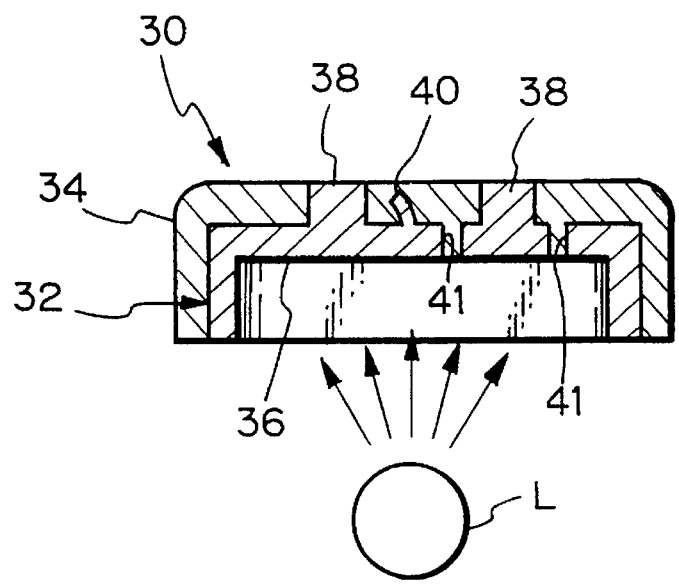
FIG. 8 is a sectional view of the molded indicating member under which a light is positioned and turned on to illuminate it.

After molding the non-light-transmittable resin, the upper mold portion is removed from the molded indicating member having the light-transmittable and non-light-transmittable sections 78, 80 with the lower mold portion being retained. Then, the rod-like portions 74, 74 of the lower mold portion 54 are pushed upwards so as to remove the indicating member from the lower mold portion. As shown in FIG. 6, when the indicating member is removed from the lower mold portion, the resin molded in the third molding space 82 is held by the holding means or annular recess 88 in the side wall of the third molding space so as to separate the molded resin from the molded indicating member of the portions thereof molded in the small diameter holes 41, 41. The resin molded in the third molding space is, as shown in FIG. 7, pushed out from the space 82 by moving the piston-like slidable portion of the lower mold portion upwards.

The light-transmittable synthetic resin and non-light-transmittable synthetic resin used in molding the indicating member are not weldable relative to each other. For instance, the light-transmittable synthetic resin is selected from the group consisting of polyacetal, polyimide, polyethylene resin, polyethylene terephthalate resin, polybutylene terephthalate resin and polypropylene and said non-light-transmittable synthetic resin is selected from the group of styrene type resins such as ABS resin.

Figure 20:
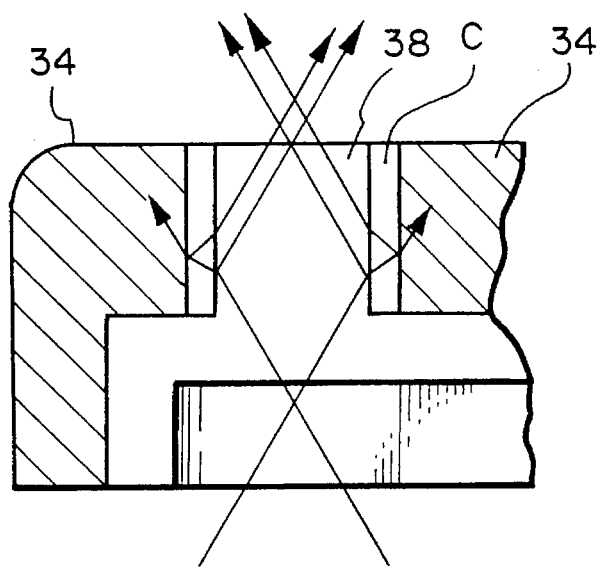

Thus, the interfaces of the light-transmittable section and the non-light-transmittable section of the molded indicating member are not fused each other and it is possible to make a microscopic air clearance C therebetween by imposing a small amount of force on the molded indicating member. FIG. 20 exaggeratedly shows such a clearance formed between a marked portion 38 of the light-transmittable section and a portion of the non-light-transmittable section 34 molded around it. It will be easily noted that, as compared with the prior art as shown in FIG. 19, a lot of light entering into the marked portion 38 from the lower or back surface thereof can reach the upper or front surface of the marked portion due to reflection including total reflection of light beams caused on the interface between the marked portion and the air clearance and an additional reflection caused on the inner wall surface of the non-light-transmittable section 34 surrounding the marked portion.

The table I noted hereinbelow shows the result of an ease of visual recognition test when lights set behind are turned off and of light-transmittability and brightness tests when the lights are turned on of marked portions of four indicating members which were molded in accordance with the steps of this invention. One of the indicating members is made completely upon the teaching of the subject invention, i.e., polyacetal resin ("IUPITAL" of Mitsubishi Gas Chemical Co., Ltd.) was used as a light-transmittable synthetic resin and a black ABS resin ("JSR ABS38B" of Nippon Synthetic Rubber Co., Ltd.) was used as a non-light-transmittable synthetic resin which is not weldable relative to the above noted polyacetal resin. The other three members differs from the first one in that those members were formed by combinations of light-transmittable and non-light-transmittable resins which had conventionally been used to form indicating members, i.e., polycarbonate resin ("IUPILONH3000R" of Mitsubishi Gas Chemical Co., Ltd. of), methacrylic resin ("VR-40" of Mitsubishi Layon Co., Ltd.) and ABS resin (Nippon Synthetic Rubber Co., Ltd.) were used as light-transmittable resins relative to a commonly used non-light-transmittable synthetic resin of black ABS resin ("JSR ABS38B" of Nippon Synthetic Rubber Co., Ltd.).

Figure 16:
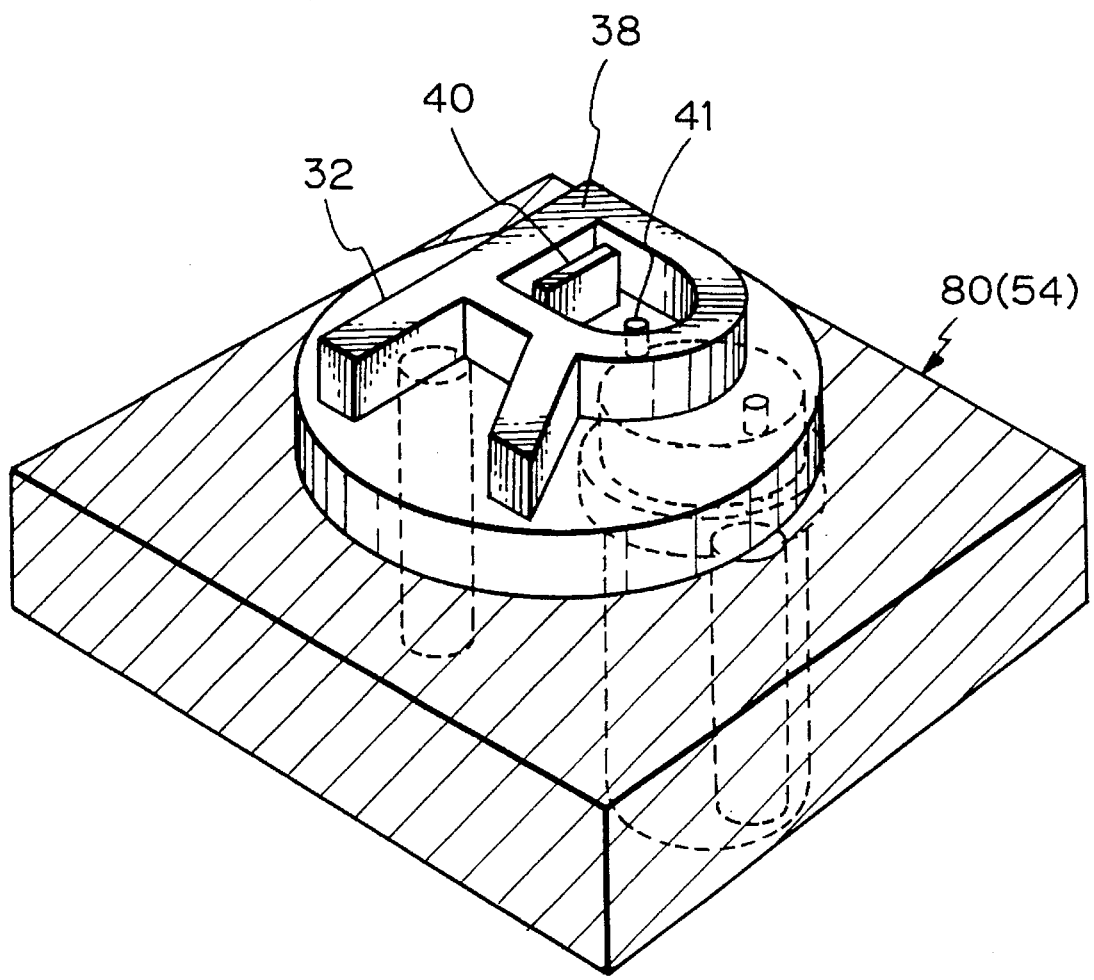
FIG. 16 is a perspective view of a light-transmittable section and a lower mold portion in accordance with the third embodiment with an upper mold portion thereof being removed.

Table II noted below shows the result of a test of effectiveness of an anchoring portion of a light-transmittable section of an indicating member formed in accordance with this invention. FIG. 16 shows a light-transmittable section containing a marked portion in the shape of "R" of indicating members tested. The Effectiveness was tested on the basis of comparison with indicating members which were formed in accordance with this invention but not include an anchoring portion as noted above. In both indicating members, a polyacetal resin ("IUPITAL F40-03" of Mitsubishi Gas Chemical Co., Ltd.) and black AB resin ("JSR ABS38B" of Nippon Synthetic Rubber Co., Ltd.) were used as light-transmittable synthetic and non-light-transmittable resins, respectively. The height of the marked portion 38 of those indicating members was about 0.6–7 mm and the height of the anchoring portion was about 0.4 mm. In the test, the indicating members were set such that the marked portions thereof face downwards and forces imposed on the back or upper surface of the light-transmittable section.

FIGS. 10–15 show a second embodiment of this invention. FIGS. 10–13 show the steps of molding an indicating member or push-button shown in FIGS. 14 and 15 which are substantially the same as that of the first embodiment explained above but a marked portion of which is in a "B" shape including two annular portions each of which surrounds a portion of an upper surface of a base portion of a light-transmittable section. Since it is necessary to fill a non-light-transmittable synthetic rein into two spaces surrounded by the two annular portions of the marked portion in a "B" shape the light-transmittable section is molded to have three small diameter through holes two of which are formed inside of the two annular portions of the marked portion and the other of which is formed outside of the same and a space in an under mold portion of the second mold is made larger to connect the three small diameter through holes.

What is claimed is:

1. An injection molding apparatus for molding an indicating member which consists of a transparent section having a base and a marking elevation standing out in relief from the upper surface of said base, said marking elevation being in the shape of an operation sign configured with at least one closed loop, and an opaque section formed on the upper surface of said base while leaving said marking elevation uncovered to make said operation sign visible, said apparatus comprising:

a first set of molding dies including a first upper molding die and a first lower molding die defining a first molding space therebetween for molding said transparent section, said first set having columns extending through said first molding space for forming small diameter through holes in said transparent section both outside and inside said loop;

a second set of molding dies including a second upper molding die and a second lower molding die between which said transparent section is placed, said second upper molding being placed to rest upon said marking elevation to define separate second and fourth molding spaces respectively outside and inside said loop between the molding surface of said second upper molding die and the upper surface of said base for forming said opaque section, said second lower die being placed under said transparent section to define a third molding space between the molding surface of said second lower molding die and the lower surface of said transparent section, said third molding space being in communication with said second and fourth molding spaces through said through holes; and said lower molding surface having a means for holding an opaque piece molded in said third molding space in order to remove said opaque piece from a molded indicating member as the indicating member is detached from said second molding set.

2. The injection molding apparatus as in claim 1, wherein said first and second molding sets have a lower molding die in common serving as said first lower molding die and said second lower molding die, said common lower molding die having a bore for defining said third molding space and said bore is provided with a piston member movable therein, said piston member ascending to eliminate said third molding space when said transparent section is molded while descending to make said third space when said opaque section is molded.

3. The injection molding apparatus as in claim 2, wherein said holding means is a groove formed in the side wall of said bore.

4. The injection molding apparatus as in claim 2, wherein said common lower molding die has a pusher for pushing said molded indicating member off said common lower molding die to remove said opaque piece molded and held in said third molding space from said indicating member.

5. The injection molding apparatus as in claim 2, wherein said first upper molding die has a recess for forming a projection standing front said base inside the loop, said projection being lower in height than said marking elevation.

\* \* \* \* \*

UNITED STATES PATENT AND TRADEMARK OFFICE
CERTIFICATE OF CORRECTION

PATENT NO. : 5,562,928
DATED : October 8, 1996
INVENTOR(S) : Yoshihiro Ando et al.

It is certified that error appears in the above-identified patent and that said Letters Patent is hereby corrected as shown below:

<u>In the Claims</u>

In Claim 5, line 3, replace "front" with --from--.

Signed and Sealed this

Fifth Day of May, 1998

*Attest:*

BRUCE LEHMAN

*Attesting Officer*        *Commissioner of Patents and Trademarks*